United States Patent
Chu et al.

(10) Patent No.: US 7,671,943 B2
(45) Date of Patent: Mar. 2, 2010

(54) TRANSFLECTIVE LIQUID CRYSTAL DISPLAY PANEL AND FABRICATING METHOD THEREOF

(75) Inventors: Cheng-Jen Chu, Tainan County (TW); Chen-Kuan Kao, Tainan County (TW); Chung-Kuang Wei, Tainan County (TW)

(73) Assignee: Chi Mei Optoelectronics Corp., Tainan (TW)

( * ) Notice: Subject to any disclaimer, the term of this patent is extended or adjusted under 35 U.S.C. 154(b) by 75 days.

(21) Appl. No.: 12/023,545

(22) Filed: Jan. 31, 2008

(65) Prior Publication Data
US 2008/0186436 A1    Aug. 7, 2008

(30) Foreign Application Priority Data
Feb. 2, 2007    (TW) .............................. 96103860 A (51) Int. Cl.
*G02F 1/1335*    (2006.01)
*G02F 1/1333*    (2006.01)

(52) U.S. Cl. ...................................... 349/114; 349/187

(58) Field of Classification Search ...................... None
See application file for complete search history.

(56) References Cited

U.S. PATENT DOCUMENTS

| 6,781,665 | B2 | 8/2004 | Nakanishi et al. |
| 6,862,065 | B2* | 3/2005 | Liao et al. .................... 349/134 |
| 2005/0162576 | A1 | 7/2005 | Sasaki et al. |
| 2005/0264730 | A1 | 12/2005 | Kataoka et al. |
| 2007/0046869 | A1* | 3/2007 | Lin et al. ..................... 349/114 |

* cited by examiner

*Primary Examiner*—Omar Rojas (57) ABSTRACT

A transflective liquid crystal display (LCD) panel includes an active device array substrate, an opposite substrate, and a liquid crystal layer in between. The active device array substrate includes scan lines, data lines, and pixel units. Each pixel unit includes an active device, a reflective pixel electrode, and a transparent pixel electrode. The active device is electrically connected to the corresponding scan line and data line. The reflective pixel electrode and the transparent pixel electrode are respectively disposed in a reflective region and a transmissive region and both electrically connected to the active device. The liquid crystal molecules in the reflective region are pre-tilted at a pretilt angle.

16 Claims, 12 Drawing Sheets

TRANSFLECTIVE LIQUID CRYSTAL DISPLAY PANEL AND FABRICATING METHOD THEREOF

This application claims the benefit of Taiwan application Serial No. 096103860, filed Feb. 2, 2007, the entirety of which is incorporated herein by reference.

BACKGROUND

1. Technical Field

The disclosure generally relates to a display panel and a fabricating method thereof, in particular, to a transflective LCD panel and a fabricating method thereof.

2. Description of Related Art

Along with the popularization of LCDs (Liquid Crystal Displays), many portable electronic products have higher requirements for the display function of the LCDs. For example, the portable electronic products are required not only to provide a fine frame display effect indoors, but also to maintain an appropriate display quality in high light environments. Therefore, the LCD technology is developed in the trend of maintaining a vivid display quality of an LCD in high light environments. In view of the above-mentioned, a transflective LCD is preferred as it can provide vivid display effects both indoors and in a bright outdoor environment.

In detail, the conventional transflective LCD panel generally adopts a dual cell gap design, in which the transmissive region and the reflective region both have a fine display quality. However, the fabrication of the transflective LCD panel with the dual cell gap design is complex, and each pixel unit has poor transmittance at the junctions areas between the transmissive regions and reflective regions. Therefore, the transflective LCD panel with a single cell gap design is desired.

Figure 1A:
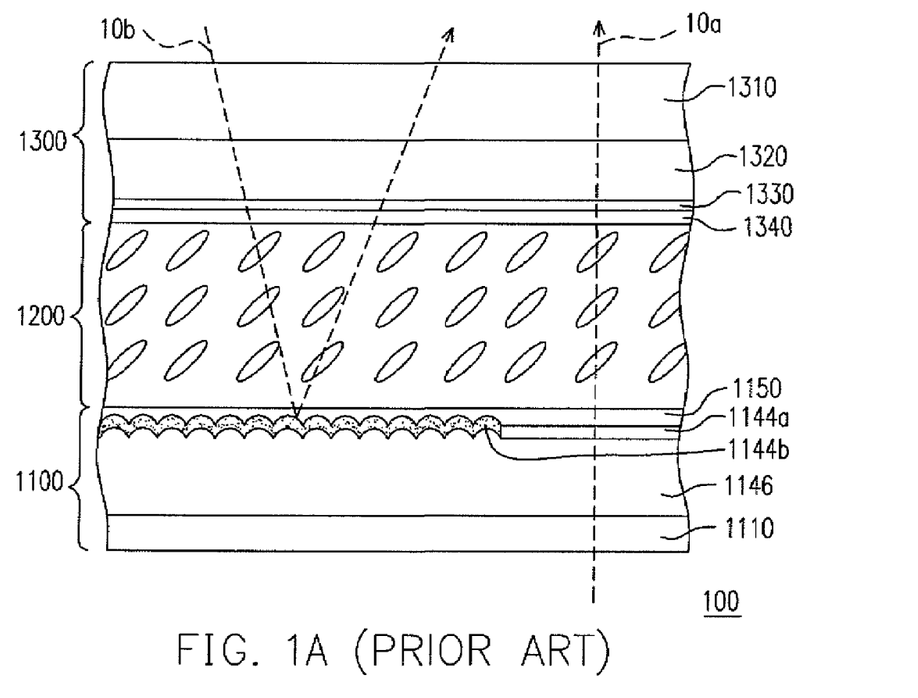
FIG. 1A is a cross-sectional view of a conventional transflective LCD panel with a single cell gap design.
Figure 1B:
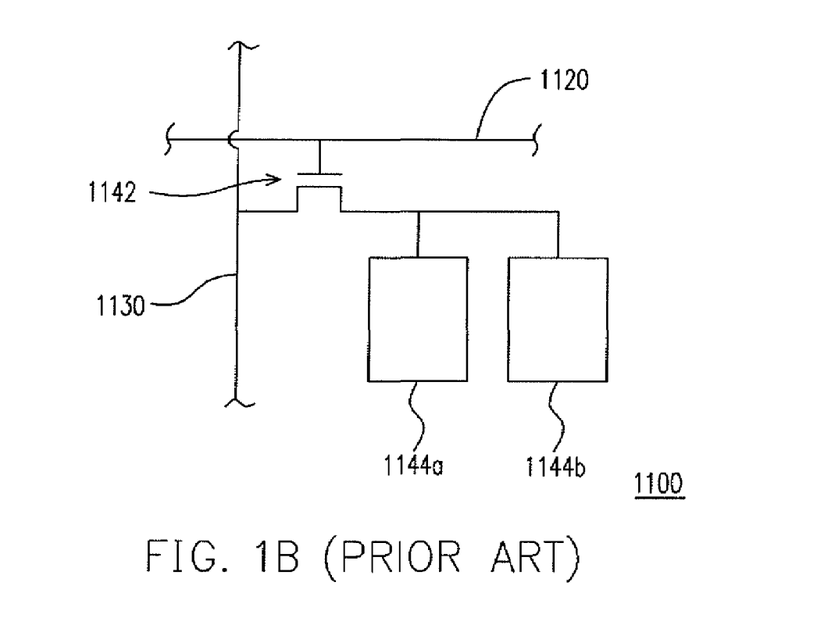
FIG. 1B is a schematic view of a pixel unit in FIG. 1A.

FIG. 1A is a cross-sectional view of a conventional transflective LCD panel with the single cell gap design, and FIG. 1B is a schematic view of a pixel unit in FIG. 1A. Referring to FIGS. 1A and 1B together, the conventional transflective LCD panel 100 includes a thin-film transistor (TFT) array substrate 1100, a color filter substrate 1300, and a liquid crystal layer 1200 disposed therebetween. Further, the color filter substrate 1300 includes a substrate 1310, a color filter 1320, a common electrode layer 1330, and an alignment film 1340. The color filter 1320 is disposed on the substrate 1310, the common electrode layer 1330 is disposed on the color filter 1320, and the alignment film 1340 is disposed on the common electrode layer 1330.

The TFT array substrate 1100 includes a substrate 1110, a plurality of scan lines 1120, a plurality of data lines 1130, a plurality of pixel units, and an alignment film 1150. The scan lines 1120, data lines 1130, and pixel units are disposed on the substrate 1110. The alignment film 1150 is disposed on the substrate 1110, and covers the scan lines 1120, data lines 1130, and pixel units. In detail, each pixel unit includes a TFT 1142, a transparent pixel electrode 1144a, a reflective pixel electrode 1144b, and a dielectric layer 1146. The TFT 1142 is electrically connected to the corresponding scan line 1120 and data line 1130. The reflective pixel electrode 1144b and the transparent pixel electrode 1144a are disposed on the dielectric layer 1146. Moreover, the reflective pixel electrode 1144b is connected to the transparent pixel electrode 1144a, and the transparent pixel electrode 1144a is electrically connected to the TFT 1142. In addition, the alignment film 1150 covers the reflective pixel electrode 1144b and the transparent pixel electrode 1144a.

Light rays 10a emitted by a backlight source (not shown) sequentially pass through the substrate 1110, the transparent pixel electrode 1144a, the liquid crystal layer 1200, and the common electrode 1330, and then emerge from the substrate 1310. Furthermore, light rays 10b from a front light source or an external environment may also sequentially pass through the substrate 1310, the common electrode 1330, and the liquid crystal layer 1200 and reach the reflective pixel electrode 1144b. Afterwards, the light rays 10b reflected by the reflective pixel electrode 1144b further sequentially pass through the liquid crystal layer 1200 and the common electrode 1330, and emerge from the substrate 1310.

Figure 2:
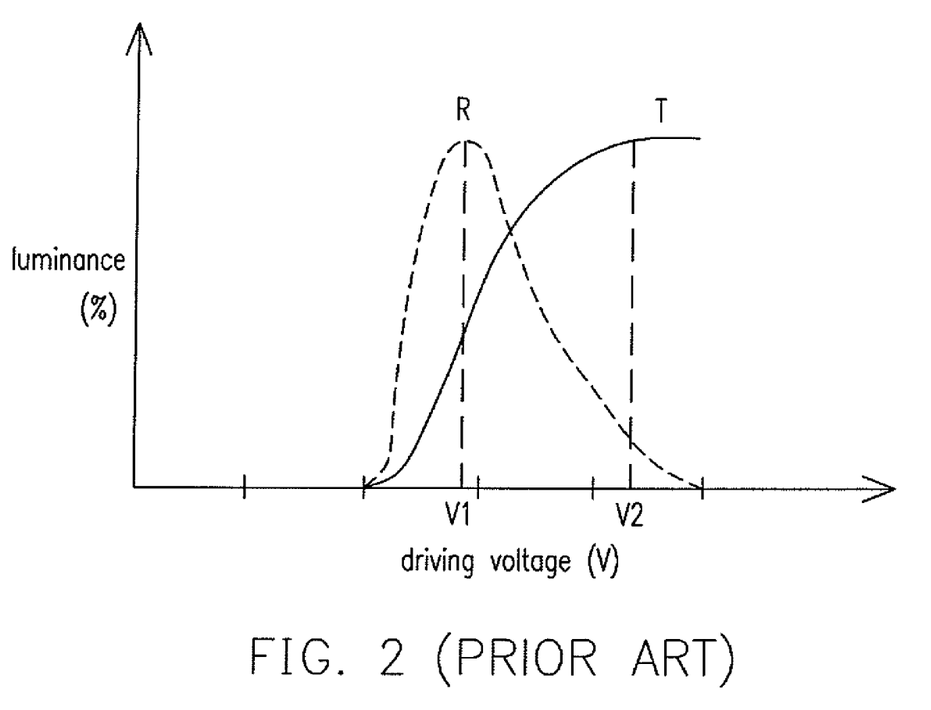
FIG. 2 is a V-T curve of a conventional transflective LCD panel with the single cell gap design.

FIG. 2 shows a driving voltage to transmittance ratio (V-T) curve of a conventional transflective LCD panel with the single cell gap design. Referring to FIGS. 1A and 2 together, since each pixel unit has a transparent pixel electrode 1144a and a reflective pixel electrode 1144b, the conventional transflective LCD panel 100 has a transmissive region V-T curve T and a reflective region V-T curve R. The transmittance ratio is a ratio between a light transmittance value and the maximum light transmittance value of the reflective or the transmissive region. Generally, the light transmittance of the reflective or the transmissive region represents a display brightness of the reflective or the transmissive region. However, at the same driving voltage, the transmittance ratio of the transmissive region V-T curve T is different from that of the reflective region V-T curve R. Moreover, a driving voltage $V_2$ required by the transmissive region for reaching its maximum light transmittance is different from a driving voltage $V_1$ required by the reflective region for reaching its maximum light transmittance. Further, since an optical path of the liquid crystal layer in the transmissive region is approximately a half of that of the liquid crystal layer in the reflective region, when the light transmittance ratio of the transmissive region grows and reaches the maximum value along with the increase of the driving voltage, the transmittance ratio of the reflective region has already passed the maximum value and began to gradually decrease with the increase of the driving voltage.

Figure 3:
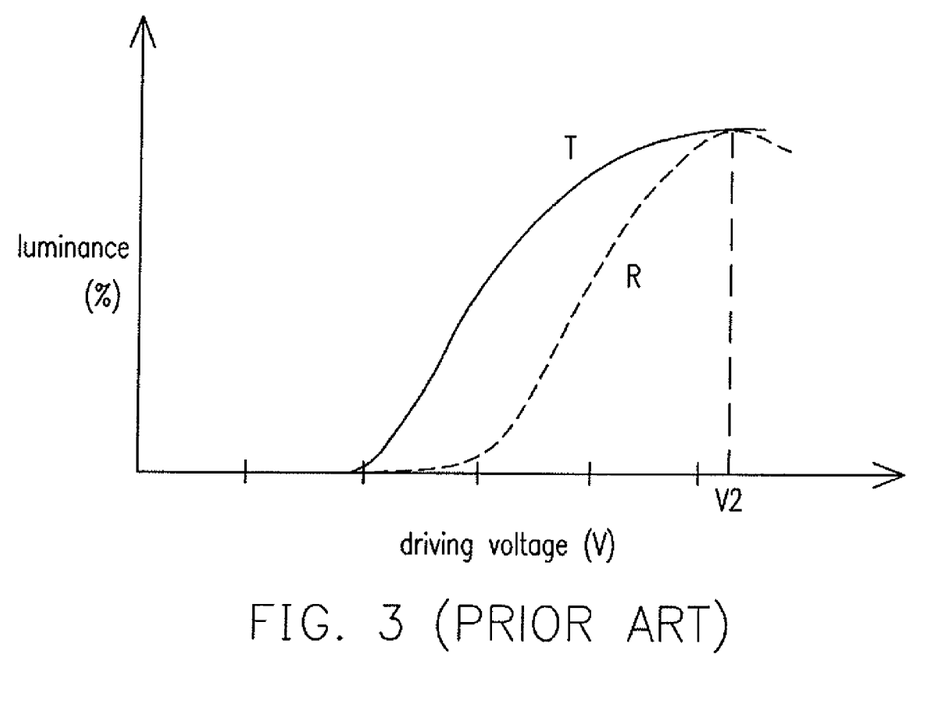
FIG. 3 is a V-T curve of another conventional transflective LCD panel with the single cell gap design.

In order to solve the above problems, a technique of adjusting the status of capacitance of the liquid crystal molecules arranged in series in the reflective region to reduce the voltage difference originally generated between the reflective pixel electrode and the common electrode layer by a driving voltage is provided. More particularly, the driving voltage required by the reflective region for reaching the maximum transmittance is made larger than the driving voltage $V_1$ in FIG. 2. Therefore, the status of capacitance of the liquid crystal molecules arranged in series in the reflective region may be appropriately adjusted to make the driving voltage required by the reflective region for reaching its maximum transmittance approximate to the driving voltage required by the transmissive region for reaching its maximum transmittance, as shown in FIG. 3.

However, when the driving voltage required by the reflective region for reaching its maximum transmittance is increased, a threshold driving voltage (the voltage turning on the transmittance) required by the reflective region is also increased accordingly, and the addition of the threshold voltage differs from that of the driving voltage for reaching the maximum transmittance. That is, the above conventional technique cannot make both the threshold voltage of the reflective region and the driving voltage required by the reflective region for reaching its maximum transmittance simultaneously approximate to the threshold voltage of the transmissive region and the driving voltage required by the transmissive region for reaching its maximum transmittance (as shown in FIG. 3). As such, the transflective LCD panel cannot have the optimal optical performances in both of the transmissive state and the reflective state simultaneously. Accordingly, there is a need for a transflective LCD panel and fabricating method that can solve the problem of the inconsistency of driving characteristics of the reflective region and the transmissive region in both a bright state and a dark state.

SUMMARY

In an embodiment, the present invention provides a transflective LCD panel including an opposite substrate, an active device array substrate, and a liquid crystal layer in between. The active device array substrate includes a plurality of scan lines, a plurality of data lines, and a plurality of pixel units. Each pixel unit has a transmissive region, a reflective region and an active device. The active device is electrically connected to the corresponding scan line and data line. The liquid crystal layer comprises a plurality of liquid crystal molecules. The liquid crystal molecules disposed above the reflective region are pre-tilted at a first pretilt angle.

In another embodiment, the present invention provides a fabricating method of a transflective LCD panel. A liquid crystal layer is formed between an active device array substrate and an opposite substrate. The liquid crystal layer comprises a plurality of liquid crystal molecules and is doped with a plurality of monomer molecules. A first voltage is applied to the reflective pixel electrode of each pixel unit of the active device array substrate, such that the liquid crystal molecules located above a reflective region of the pixel unit are titled at a first pretilt angle. Then, the monomer molecules in the reflective region are converted into polymer molecules.

It is to be understood that both the foregoing general description and the following detailed description are exemplary only. Additional aspects and advantages of the disclosed embodiments are set forth in part in the description which follows, and in part are apparent from the description, or may be learned by practice of the disclosed embodiments. The aspects and advantages of the disclosed embodiments may also be realized and attained by means of the instrumentalities and combinations particularly pointed out in the appended claims.

BRIEF DESCRIPTION OF THE DRAWINGS

The accompanying drawings are included to provide a further understanding of embodiments of the invention, and are incorporated in and constitute a part of this specification.

DESCRIPTION OF THE EMBODIMENTS

Reference will now be made in detail to embodiments of the invention, examples of which are illustrated in the accompanying drawings. Wherever possible, the same reference numbers are used in the drawings and the description to refer to the same or like parts.

Figure 4A:
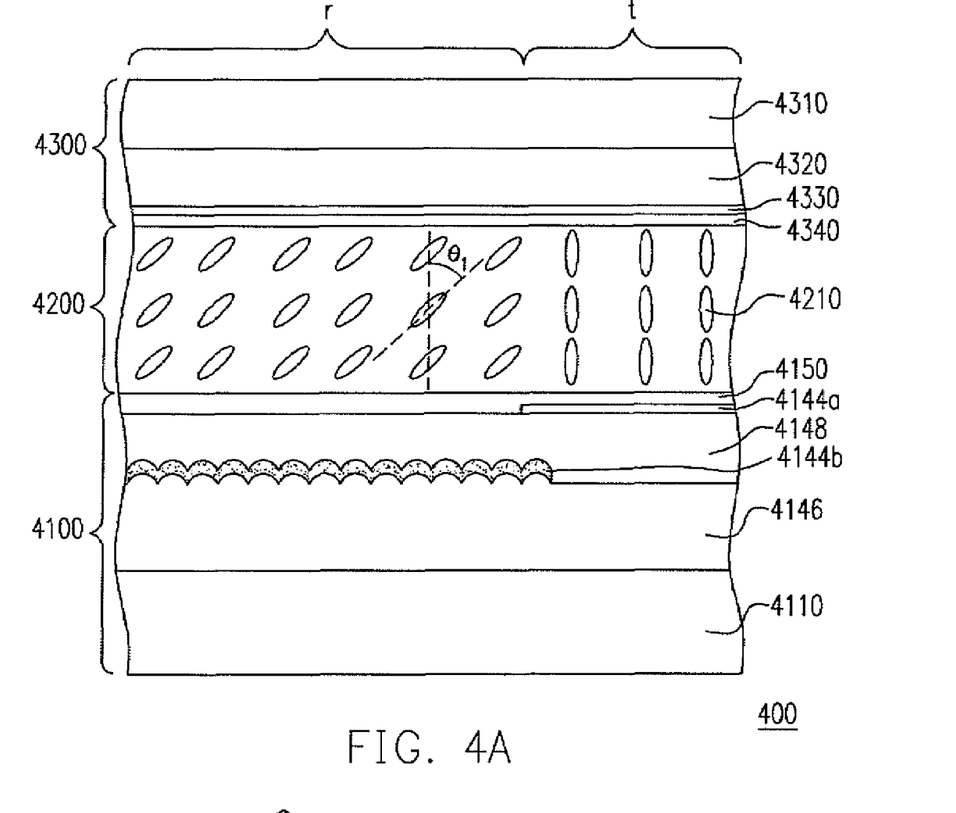
FIG. 4A is a cross-sectional view of a transflective LCD panel according to a first embodiment of the present invention.
Figure 4B:
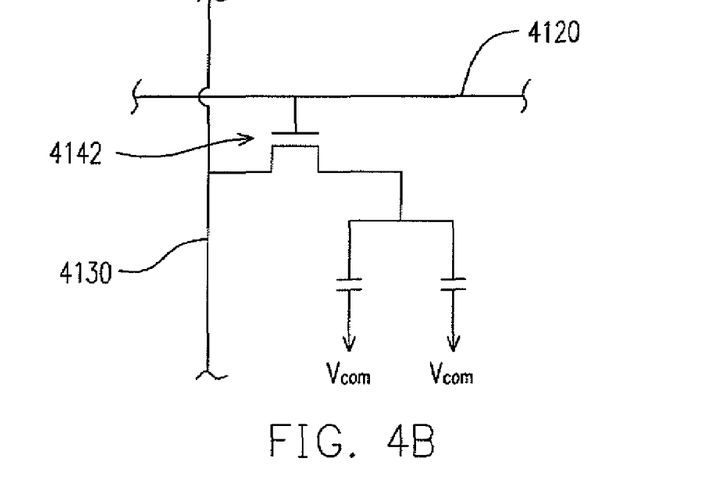
FIG. 4B is an equivalent circuit diagram of a pixel unit in FIG. 4A.

FIG. 4A is a cross-sectional view of a transflective LCD panel according to a first embodiment of the present invention, and FIG. 4B is an equivalent circuit diagram of a pixel unit in FIG. 4A. Referring to FIGS. 4A and 4B together, the transflective LCD panel 400 includes an active device array substrate 4100, an opposite substrate 4300, and a liquid crystal layer 4200. In this embodiment, the opposite substrate 4300 is a color filter substrate, and the active device array substrate 4100 may be a TFT array substrate, a diode array substrate, or a substrate comprised of other three-terminal active devices. However, the active device array substrate 4100 may also be a color-filter-on-array (COA) substrate, while the opposite substrate 4300 is a glass substrate. The COA substrate has a structure with a color filter formed on a TFT array.

The opposite substrate 4300 includes a substrate 4310, a color filter 4320, a common electrode layer 4330, and an alignment film 4340. The color filter 4320 is disposed on the substrate 4310, the common electrode layer 4330 is disposed on the color filter 4320, and the alignment film 4340 is disposed on the common electrode layer 4330.

The active device array substrate 4100 includes a substrate 4110, a plurality of scan lines 4120, a plurality of data lines 4130, a plurality of pixel units (unnumbered), and an alignment film 4150. The scan lines 4120, data lines 4130, and pixel units are disposed on the substrate 4110. The alignment film 4150 is disposed on the substrate 4110, and covers the scan lines 4120, data lines 4130, and the pixel units.

Moreover, each pixel unit has a reflective region r and a transmissive region t and includes an active device 4142, a transparent pixel electrode 4144a, and a reflective pixel electrode 4144b. The active device 4142 is electrically connected to the corresponding scan line 4120 and data line 4130. Furthermore, a material of the reflective pixel electrode 4144b may be Al, Ag, or any other metals with high reflectance. The reflective pixel electrode 4144b and the transparent pixel electrode 4144a are respectively disposed in the reflective region r and the transmissive region t and both electrically connected to the active device 4142.

It should be noted that the reflective pixel electrode 4144b may be directly electrically connected to the active device 4142. Or, the reflective pixel electrode 4144b may be electrically connected to the active device 4142, for example, a drain of the active device 4142, through the transparent pixel electrode 4144a. Similarly, the transparent pixel electrode 4144a may be directly electrically connected to the active device 4142. Or, the transparent pixel electrode 4144a may be electrically connected to the active device 4142 through the reflective pixel electrode 4144b. In other words, when the active device 4142 is turned on, the transparent pixel electrode 4144a and the reflective pixel electrode 4144b may obtain the same pixel driving voltage. It should be noted that the active device 4142 is, for example, a TFT, and the transparent pixel electrode 4144a and the reflective pixel electrode 4144b are electrically connected to a drain of the active device 4142. Definitely, the active device 4142 is not limited to the above embodiment, and may also be a diode or any other three-terminal active device.

When a driving voltage is input into the transparent pixel electrode 4144a and the reflective pixel electrode 4144b through the active device 4142, the potential difference between the reflective pixel electrode 4144b and the common electrode layer 4330 of the opposite substrate 4300 is smaller than that between the transparent pixel electrode 4144a and the common electrode layer 4330. As such, the driving voltage required by the reflective region r of the transflective LCD panel 400 for reaching its maximum transmittance is increased to be approximate to the driving voltage required by the transmissive region t for reaching its maximum transmittance.

Further, in this embodiment, for example, a dielectric layer 4148 is disposed on the substrate 4110 and covers the reflective pixel electrode 4144b. The transparent pixel electrode 4144a is disposed on the dielectric layer 4148. In this manner, the distance between the reflective pixel electrode 4144b and the common electrode layer 4330 is greater than that between the transparent pixel electrode 4144a and the common electrode layer 4330. Therefore, when a driving voltage is input into the transparent pixel electrode 4144a and the reflective pixel electrode 4144b, the electric field intensity in the reflective region r is smaller than that in the transmissive region t.

The material of the dielectric layer 4148 is an organic material or an inorganic material, and may also be a gate insulating layer extending from the active device 4142 or other additional dielectric layers. However, the dielectric layer 4148 may also be a passivation layer or a planarization layer covering on the active device 4142. Further, the material of the transparent pixel electrode 4144a is an indium tin oxide (ITO), indium zinc oxide (IZO), aluminium zinc oxide (AZO), or other transparent conductive materials.

In addition, the transparent pixel electrode 4144a is partially disposed above, i.e., overlapping, the reflective pixel electrode 4144b, so as to shield against light leakage caused by the liquid crystal molecules irregularly arranged at the junction area of the reflective region r and the transmissive region t.

The liquid crystal layer 4200 is comprised of a plurality of liquid crystal molecules 4210, and the liquid crystal molecules 4210 are, for example, nematic liquid crystal molecules. Further, the liquid crystal layer 4200 is disposed between the active device array substrate 4100 and the opposite substrate 4300. In addition, a single cell gap is approximately formed between the active device array substrate 4100 and the opposite substrate 4300 in this embodiment.

In particular, the liquid crystal molecules 4210 located in the reflective region r are subject to a pretilt angle $\theta_1$, in other words, are pre-tilted at a pretilt angle $\theta_1$ before being driven by the driving electric field in use. The liquid crystal molecules 4210, for example, maintain the pretilt angle thereof through polymer molecules (not shown) doped in the liquid crystal layer 4200 (a fabricating method thereof will be described in detail herein below). Since the liquid crystal molecules 4210 in the reflective region r are subject to a pretilt angle $\theta_1$, they are easily driven by the electric field to rotate, such that the threshold voltage of the liquid crystal molecules 4210 in the reflective region r is reduced to be approximate to the threshold voltage of the liquid crystal molecules 4210 in the transmissive region t.

In particular, before a driving voltage is input into the transflective LCD panel 400, the alignment films 4340 and 4150 are used to, for example, make the liquid crystal molecules 4210 in the transmissive region t arranged in a vertical alignment. That is, the pretilt angle of liquid crystal molecules 4210 in the transmissive region is 0°, and the liquid crystal molecules 4210 in the reflective region r are arranged at an angle of $\theta_1$ from the normal of the alignment films 4340 and 4150. Definitely, in other embodiments, the alignment films 4340 and 4150 may also be used to make the liquid crystal molecules 4210 in the transmissive region t arranged in a horizontal alignment. Thus, the liquid crystal molecules 4210 in the reflective region r are arranged at an angle of $\theta_1$ relative to the surface, of the alignment films 4340 and 4150, respectively.

Figure 5:
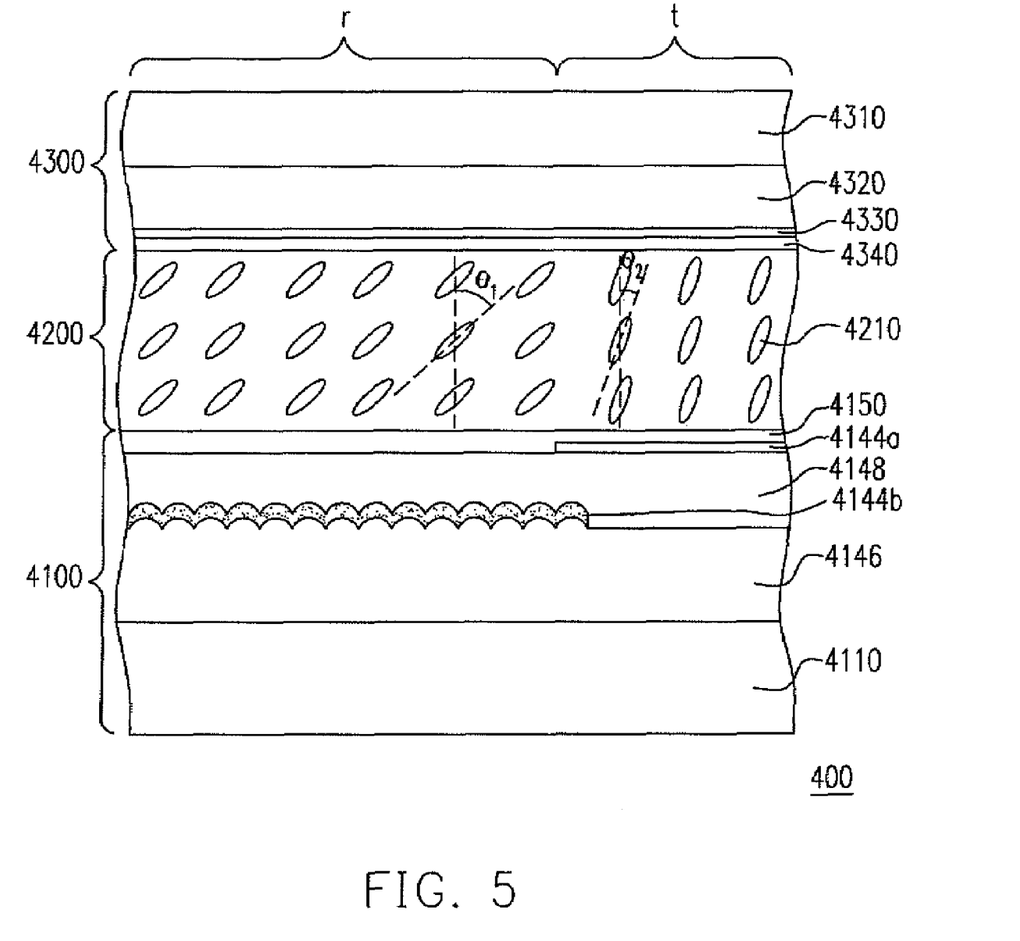
FIG. 5 is a schematic cross-sectional view of a transflective LCD panel according to a second embodiment of the present invention.

FIG. 5 is a schematic cross-sectional view of a transflective LCD panel according to a second embodiment of the present invention. Referring to FIG. 5, in this embodiment, the liquid crystal molecules 4210 in the transmissive region t may also are subject to a pretilt angle $\theta_2$, such that the liquid crystal molecules 4210 in both the transmissive region t and the reflective region r can be driven by a driving voltage to rotate quickly. It should be noted that after a driving voltage is input into the transparent pixel electrode 4144a and the reflective pixel electrode 4144b, the electric field intensity in the reflective region r is still smaller than that in the transmissive region t, so the pretilt angle $\theta_2$ must be smaller than the pretilt angle $\theta_1$ (including $\theta_2$=0° in the first embodiment). Thus, the threshold voltage of the liquid crystal molecules 4210 in the reflective region r can be adjusted to be approximate to that of the liquid crystal molecules 4210 in the transmissive region t.

Figure 6:
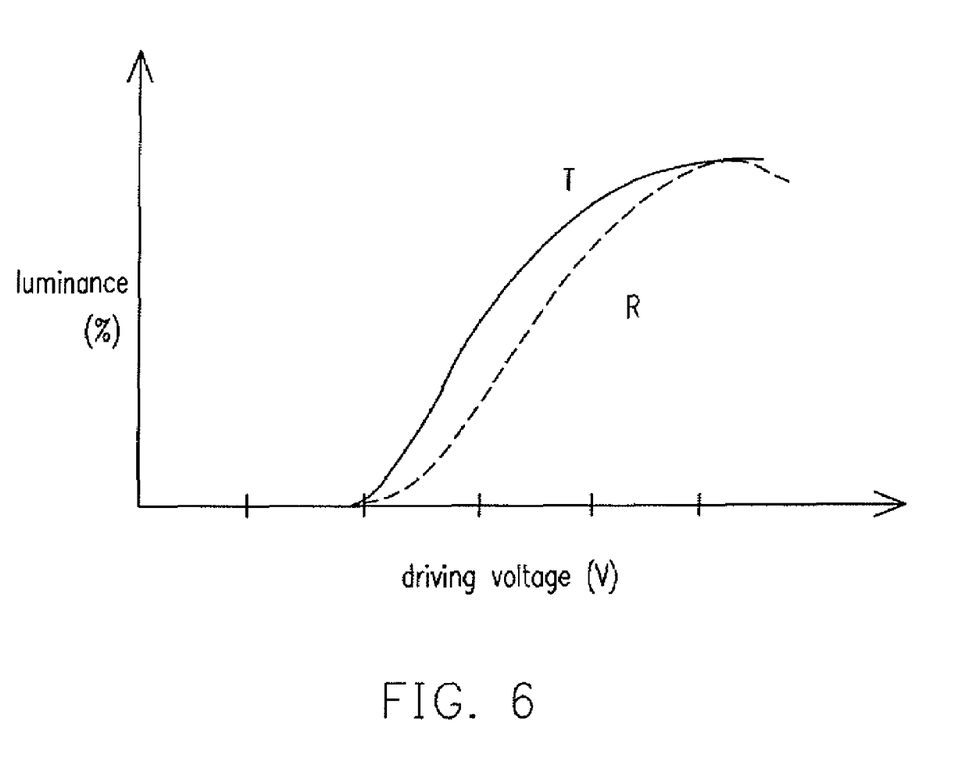
FIG. 6 is a V-T curve of a transflective LCD panel according to the first embodiment of the present invention.

FIG. 6 is a V-T curve of a transflective LCD panel according to the first embodiment of the present invention. Referring to FIGS. 4A and 6 together, the appropriate material and thickness of the dielectric layer 4148 may be selected according to the above disclosed arrangement. When the same driving voltage is respectively input into the transparent pixel electrode 4144a and the reflective pixel electrode 4144b, the difference between the transmittance ratios of the transmissive V-T curve T and the reflective V-T curve R is reduced. In other words, the transflective LCD panel 400 of this embodiment may be driven in a conventional driving manner. The transmittance of the transmissive region t and the reflective region r rises with the increase of the driving voltage, and the driving voltage required by the transmissive region t for reaching its maximum transmittance is approximate to that required by the reflective region r for reaching its maximum transmittance.

In particular, in the disclosed embodiments of the present invention, when the driving voltage required by the reflective region r for reaching its maximum transmittance is increased, the liquid crystal molecules are provided with an appropriate pretilt angle to lower the threshold voltage of the liquid crystal molecules 4210 in the reflective region r. Thus, the transflective LCD panel 400 of the disclosed embodiments of the present invention has similar voltage-transmittance performance in the transmissive region t and the reflective region r in both the bright state and the dark state. That is, the transflective LCD panel of the disclosed embodiments of the present invention has high brightness and good display quality without adopting the dual cell gap design.

The V-T curve of the transflective LCD panel in the second embodiment is similar to FIG. 6, and the details will not be described herein again.

Further, referring to FIGS. 4A and 6, in order to improve the reflectivity of the reflective pixel electrode 4144b, the reflective pixel electrode 4144b is fabricated to have a bumped surface, and the surface pattern of the reflective pixel electrode 4144b is not limited thereto, in accordance with the present invention. The reflective pixel electrode 4144b with a bumped surface is fabricated by first forming a dielectric layer 4146 with a bumped surface on the substrate 4100. Then, a reflective pixel electrode 4144b is conformally formed on the dielectric layer 4146 by, for example, a sputtering process. However, the reflective pixel electrode 4144b with a bumped surface may have other patterns details of which will be illustrated herein below.

Figure 7:
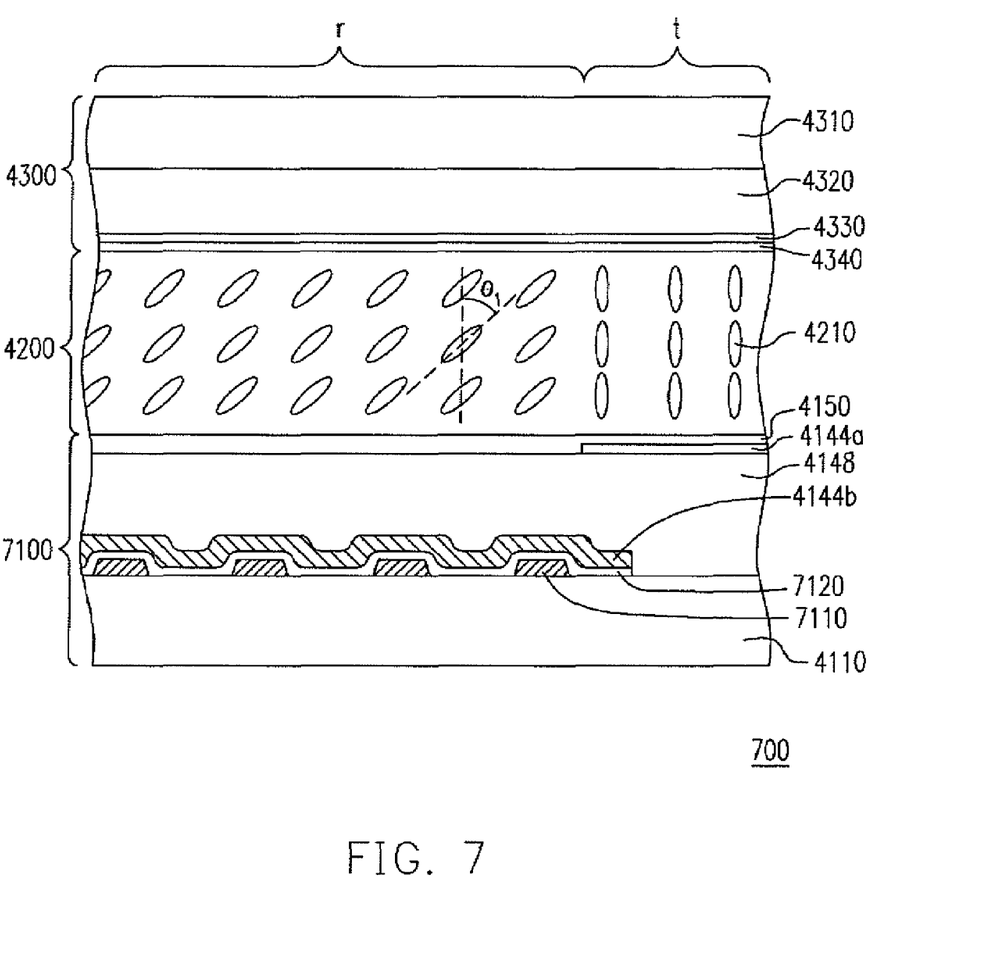
FIG. 7 is a cross-sectional view of a transflective LCD panel according to a third embodiment of the present invention.

FIG. 7 is a cross-sectional view of a transflective LCD panel according to a third embodiment of the present invention. This embodiment is similar to the first embodiment, but differs from the first embodiment in the manner of forming the reflective pixel electrode 4144b with a bumped surface, which will be described as follows.

Referring to FIGS. 4B and 7 together, in the transflective LCD panel 700 of this embodiment, each pixel unit of an active device array substrate 7100 includes an active device 4142, a bumped metal layer 7110, a dielectric layer 7120, a transparent pixel electrode 4144a, a reflective pixel electrode 4144b, and a dielectric layer 4148. The bumped metal layer 7110 is disposed on the substrate 4110 and may be a part of a first metal layer that constitutes the active device 4142. That is, the bumped metal layer 7110 may be electrically connected to a common line (not shown) of the active device array substrate 7100 or the bumped metal layer 7110 is a part of a common line. Thus, a storage capacitor is formed between the bumped metal layer 7110 and the reflective pixel electrode 4144b. Here, since the common line is mostly disposed below the reflective pixel electrode 4144b, the backlight source of the transmissive region t may not be shielded by the common line, and the aperture ratio thereof is improved.

Further, the dielectric layer 7120 is conformally disposed on the bumped metal layer 7110, and may be a gate insulating layer. The reflective pixel electrode 4144b is conformally disposed on the dielectric layer 4120, and thus has a bumped surface for improving the reflectivity. In addition, the reflective pixel electrode 4144b may be a portion of a second metal layer that constitutes the active device 4142.

Similarly, the appropriate material and thickness of dielectric layer 4148 may be selected according to the above-disclosed electrical configuration. When the active device 4142 is turned on, the driving voltage required by the transmissive region t for reaching its maximum transmittance is approximate to that required by the reflective region r for reaching its maximum transmittance. On the other hand, since the pretilt angle $\theta_1$ of the liquid crystal molecules 4210 in the reflective region r is larger than that (which is 0° in this embodiment) of the liquid crystal molecules 4210 in the transmissive region t, the threshold voltage of the transmissive region t is approximate to that of the reflective region r. Therefore, the transflective LCD panel 700 of this embodiment has similar voltage controlled transmittance performance in the transmissive region t and the reflective region r, without adopting the dual cell gap design. In addition, the reflective pixel electrode 4144b having a bumped surface may achieve a high reflectivity.

Figure 8A:
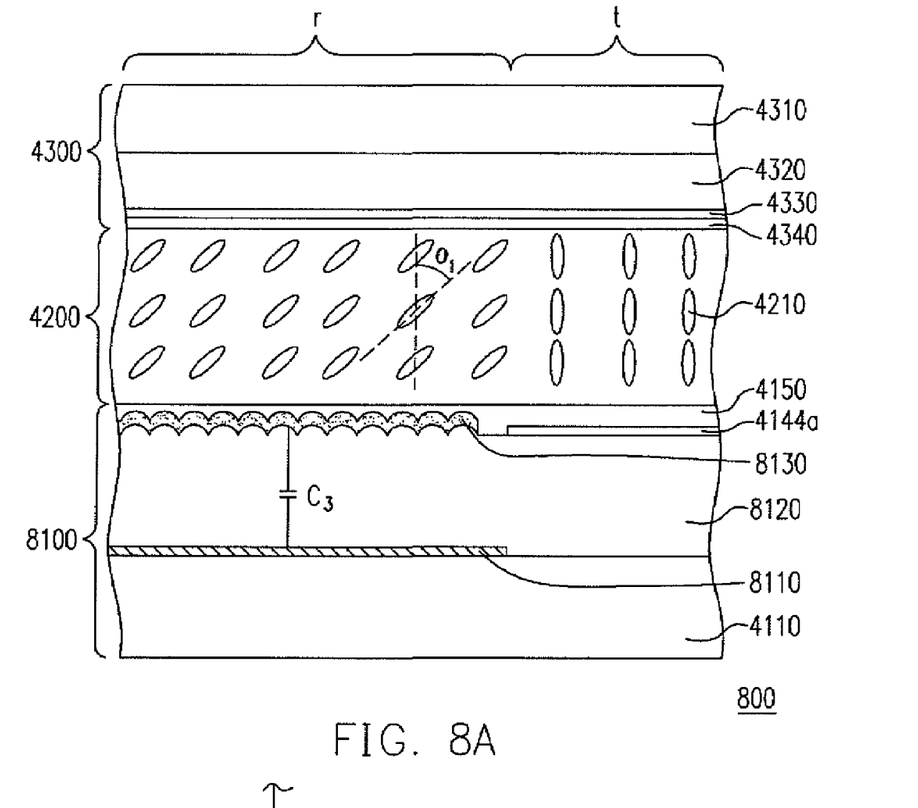
FIG. 8A is a cross-sectional view of a transflective LCD panel according to a fourth embodiment of the present invention.
Figure 8B:
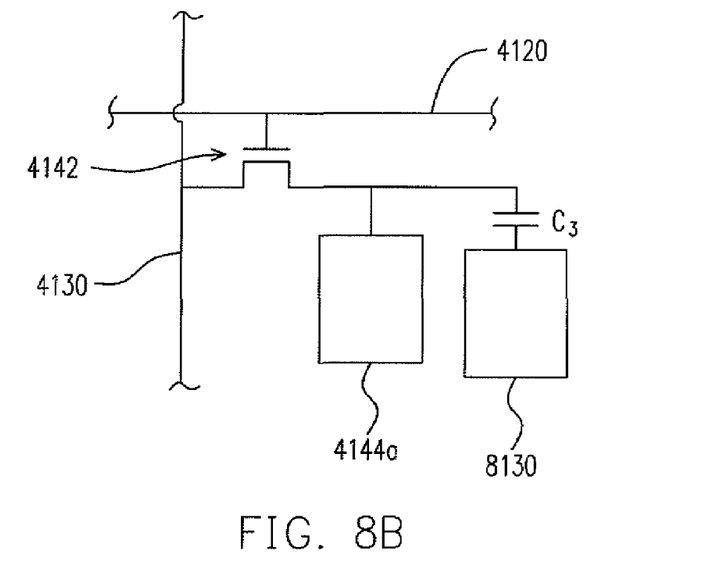
FIG. 8B is a schematic view of a pixel unit in FIG. 8A.

FIG. 8A is a cross-sectional view of a transflective LCD panel according to a fourth embodiment of the present invention, and FIG. 8B is a schematic view of a pixel unit in FIG. 8A. This embodiment is similar to the first embodiment, and the difference is described as follows. The potential difference between the reflective pixel electrode 4144b and the common electrode layer 4330 of the opposite substrate 4300 is smaller than that between the transparent pixel electrode 4144a and the common electrode layer 4330. The difference between the two embodiments will be illustrated below.

Referring to FIGS. 8A and 8B together, in the transflective LCD panel 800 of this embodiment, each pixel unit of an active device array substrate 8100 includes an active device 4142, a metal layer 8110, a dielectric layer 8120, a transparent pixel electrode 4144a, and a reflective pixel electrode 8130. The metal layer 8110 is electrically connected to the active device 4142, and may be a part of a first or a second metal layer that constitutes the active device 4142. Furthermore, the metal layer 8110 may be directly electrically connected to the active device 4142. Or, the metal layer 8110 is electrically connected to the active device 4142 through the transparent pixel electrode 4144a. Moreover, the dielectric layer 8120 is disposed on the substrate 2110, and covers the metal layer 8110. In addition, the material of the dielectric layer 8120 is an organic material or an inorganic material.

The reflective pixel electrode 8130 is disposed on the dielectric layer 8120, and is coupled with the metal layer 8110 to form a capacitor $C_3$. In other words, the reflective pixel electrode 8130 is a floating electrode, i.e., an independent conductor layer without connecting to other potentials. In another embodiment, the reflective pixel electrode 8130 may have a bumped surface for improving the reflectivity.

It should be noted that, the overlapping area of and the distance between the reflective pixel electrode 8130 and the metal layer 8110 determine an effective voltage applied to the liquid crystal layer 4200 above the reflective pixel electrode 8130. The transparent pixel electrode 4144a is directly electrically connected to the active device 4142, and the reflective pixel electrode 8130 is electrically coupled to the metal layer 8110. Therefore, when a particular driving voltage is input into the pixel units through the data lines 4120, the voltage of the transparent pixel electrode 4144a is opposite to that of the reflective pixel electrode 8130, and thus the effective voltage applied to the transparent pixel electrode 4144a is opposite to that applied to the liquid crystal layer 4200 above the reflective pixel electrode 8130. The overlapping area of and the distance between the reflective pixel electrode 8130 and the metal layer 8110 may determine the voltage of the reflective pixel electrode 8130, so the driving voltage required by the transmissive region t for reaching its maximum transmittance is approximate to that required by the reflective region r for reaching its maximum transmittance.

On the other hand, since the pretilt angle $\theta_1$ of the liquid crystal molecules 4210 in the reflective region r is larger than that (which is 0° in this embodiment) of each liquid crystal molecule 4210 in the transmissive region t, the threshold voltage of the transmissive region t is made approximate to that of the reflective region r.

In disclosed embodiments of the present invention, in the course of the fabrication of the transflective LCD panel, the pretilt angle of the liquid crystal molecules in the reflective region is made to be larger than that of the liquid crystal molecules in the transmissive region. The fabricating method of a transflective LCD panel of the present invention is illustrated in the following embodiments.

Figure 9A:
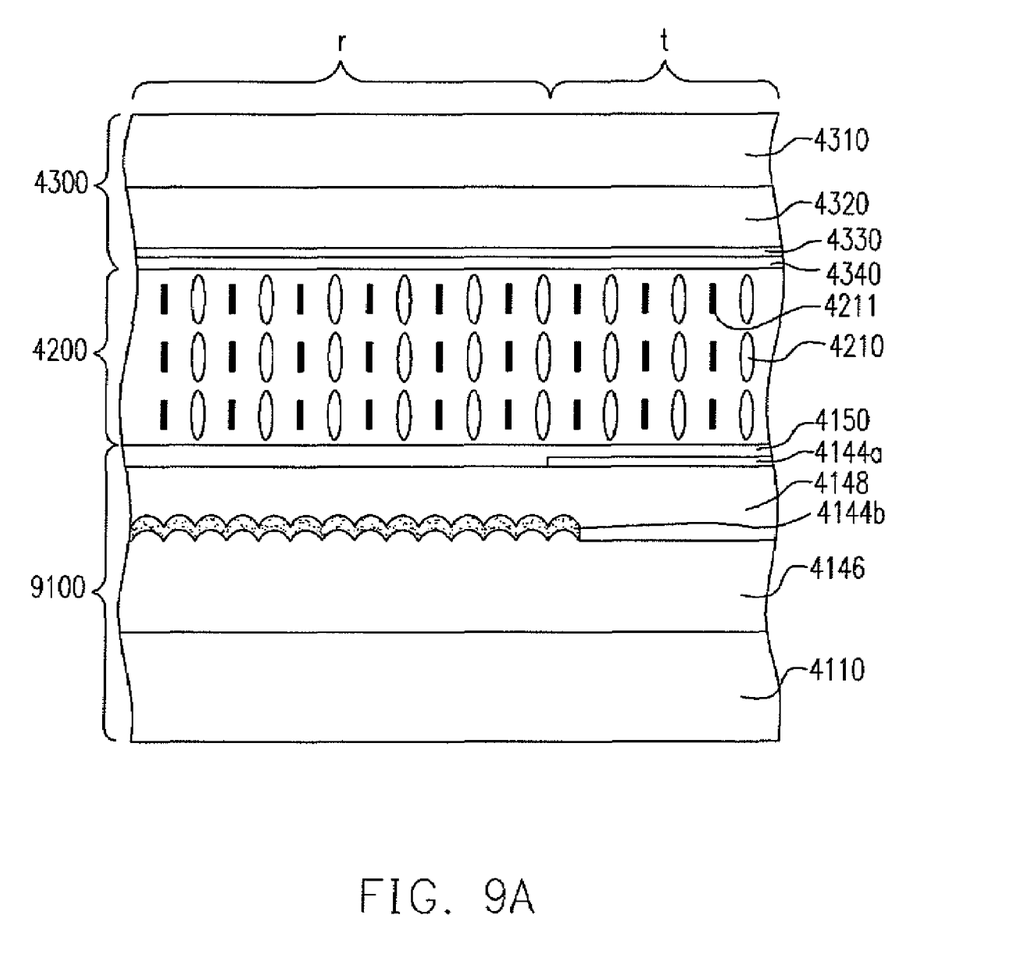
FIGS. 9A to 9C are cross-sectional views of processes of fabricating a transflective LCD panel according to an embodiment of the present invention.
Figure 9B:
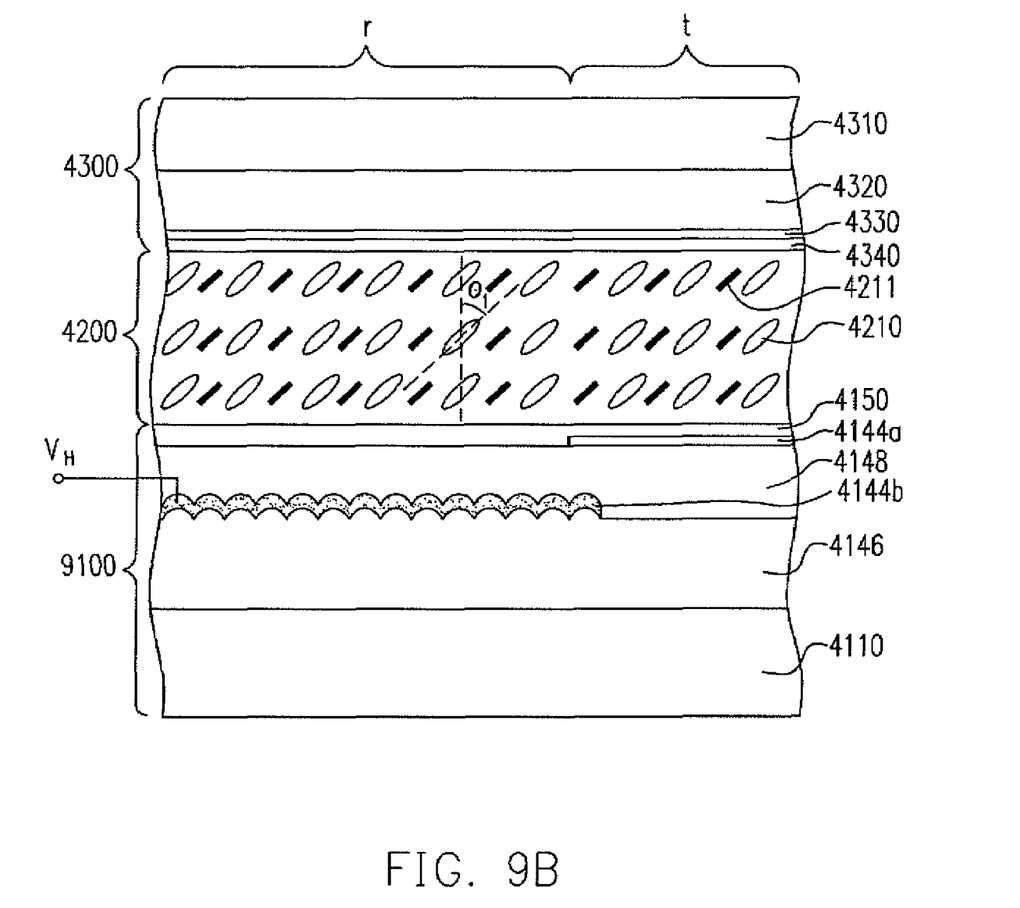
Figure 9C:
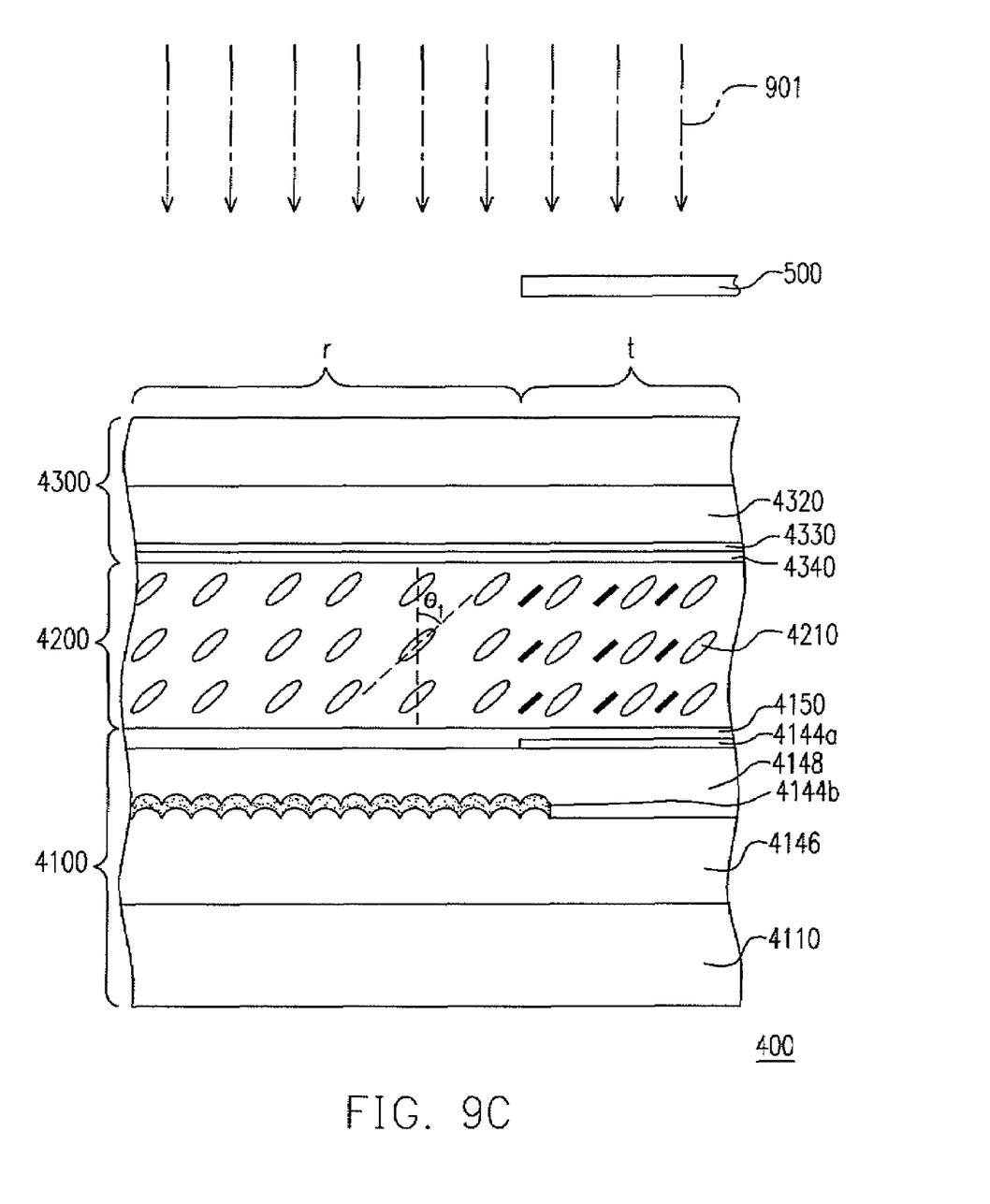

FIGS. 9A to 9C are cross-sectional views of processes of fabricating a transflective LCD panel according to an embodiment of the present invention. Referring to FIG. 9A, first, an active device array substrate 9100 is provided. It should be noted that although the active device array substrate 9100 in FIG. 9A is similar to the active device array substrate 4100 in FIG. 4A, the active device array substrate 9100 may be any active device array substrate described in the above embodiments. Next, an opposite substrate 4300 is disposed above the active device array substrate 9100, and a liquid crystal layer 4200 is formed between the opposite substrate 4300 and the active device array substrate 9100. The liquid crystal layer 4200 is, for example, doped with a plurality of monomer molecules 4211.

Referring to FIG. 9B, a first voltage $V_H$ is applied through an external circuit (not shown) to the reflective pixel electrode 4144b, such that the liquid crystal molecules 4210 located in the liquid crystal layer 4200 are tilted in a pretilt angle $\theta_1$. Afterwards, referring to FIG. 9C, the monomer molecules 4211 in the reflective region r are exposed by a masking process, so as to be converted into polymer molecules (not shown). The expose-to-convert principle is described in detail in U.S. Pat. No. 6,781,665, which is incorporated by reference herein. Thus, the transflective LCD panel 900 is substantially completed. In this embodiment, the monomer molecules are exposed to, for example, UV light 901. The TV light 901 is incident from above the opposite substrate 4300, and the transmissive region t is covered by a mask 500, such that the monomer molecules 4211 in the transmissive region t are not irradiated with the UV light 901 to be converted into polymer molecules. Further, the subsequent process of the transflective LCD panel 900 is similar or identical to that of a transflective LCD panel, which is known to those skilled in the art, and the details will not be described herein again.

Figure 10:
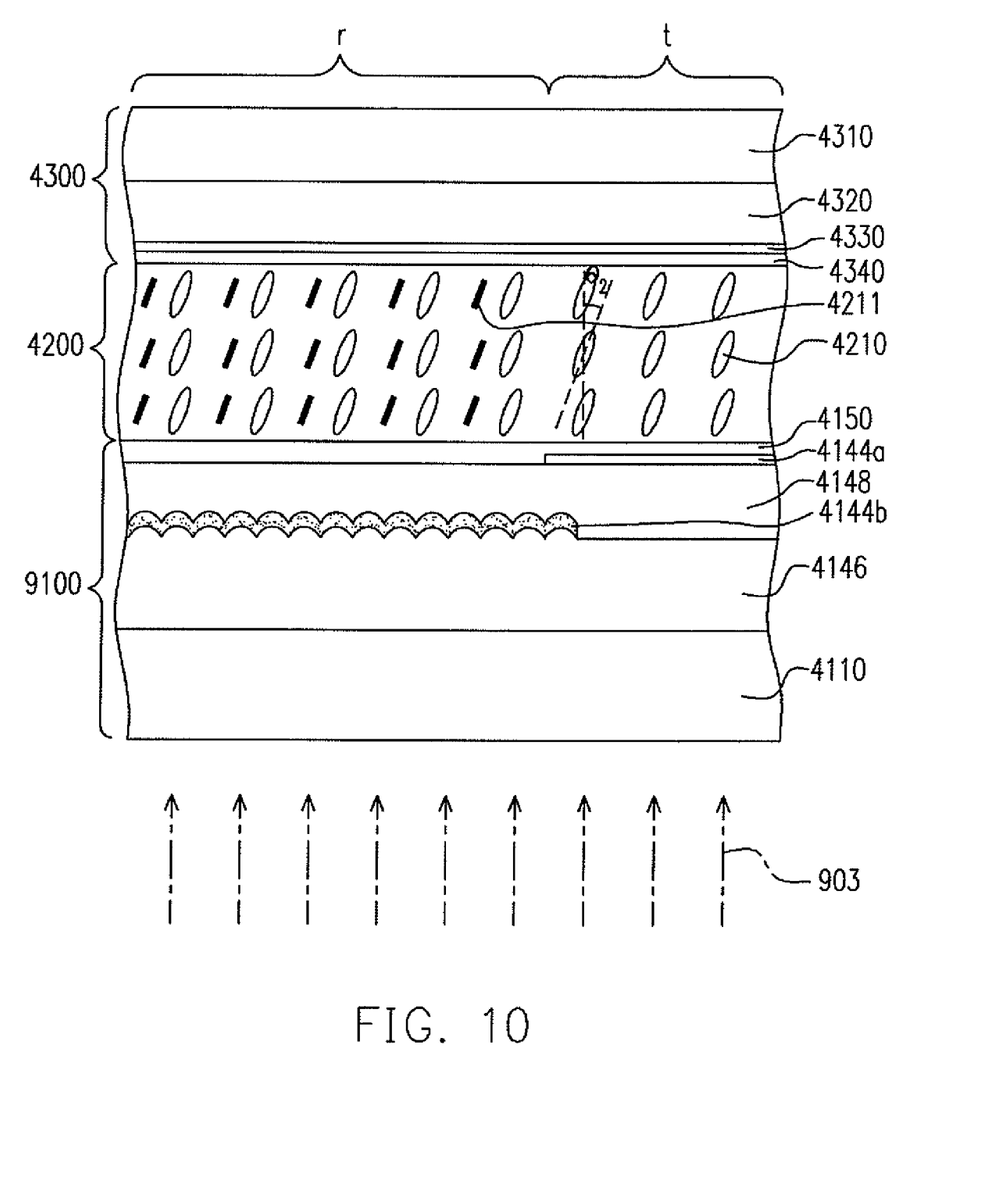
FIG. 10 is a schematic cross-sectional view showing the liquid crystal molecules having a pretilt angle in the transmissive region according to an embodiment of the present invention.

It should be noted that in another embodiment of the present invention, before the monomer molecules 4211 in the transmissive region t are converted into polymer molecules, a second voltage $V_L$ is applied to the transparent pixel electrode 4144a, such that the liquid crystal molecules 4211 in the transmissive region t are tilted in a pretilt angle $\theta_2$, as shown in FIG. 10. The second voltage is smaller than the first voltage applied to the reflective pixel electrode 4144b. In other words, the pretilt angle $\theta_2$ is smaller than the pretilt angle $\theta_1$.

Thereafter, the monomer molecules 4211 in the transmissive region t are exposed, and the liquid crystal molecules 4210 in the transmissive region t become restricted to be subject to a pretilt angle $\theta_2$. In this embodiment, for example, the monomer molecules 4211 in the transmissive region t are exposed to UV light 903, and the UV light 903 is, for example, incident from below the active device array substrate 9100 (i.e., from the back of the transflective LCD panel). At this time, since the reflective pixel electrode 4144b is capable of shielding the light, the monomer molecules 4211 in the reflective region r may not be irradiated by the UV light 903.

Thus, in order to make the liquid crystal molecules 4210 in the transmissive region t and the reflective region r are subject to different pretilt angles, a low voltage is first applied to the transparent pixel electrode 4144a, and then the exposure light is incident from below the active device array substrate 9100, such that the monomer molecules 4211 in the transmissive region t are exposed and converted into polymers. After that, a higher voltage is applied to the reflective pixel electrode 4144b, and the exposure light is incident from above the opposite substrate 4300, such that the monomer molecules 4211 in the reflective region r are exposed and converted into polymers.

In view of the above, disclosed embodiments of the present invention are superior to the conventional art in the following aspects. For the transflective LCD panel, the driving voltage required by the reflective region for reaching its maximum transmittance is approximate to that required by the transmissive region for reaching its maximum transmittance. Meanwhile, the threshold voltage of the reflective region is approximate to that of the transmissive region. In other words, in disclosed embodiments of the present invention, the reflective V-T curve and the transmissive V-T curve of the transflective LCD panel are highly coincident. Therefore, the transflective LCD panel of embodiments of the present invention not only has similar voltage controlled transmittance performance in the transmissive and reflective regions in the bright state, and achieves high brightness and good display quality without adopting the dual cell gap design, but also has optimized optical performance in the dark state.

It will be apparent to those skilled in the art that various modifications and variations can be made to the disclosed embodiments of the present invention without departing from the scope or spirit of the invention. In view of the foregoing, it is intended that the present invention cover modifications and variations that fall within the scope of the following claims and their equivalents.

What is claimed is:

1. A transflective liquid crystal display (LCD) panel, comprising:
    an active device array substrate comprising a plurality of scan lines, a plurality of data lines, and a plurality of pixel units, wherein each said pixel unit comprises a transmissive region, a reflective region and an active device electrically connected to a corresponding one of the scan lines and a corresponding one of the data lines;
    an opposite substrate; and
    a liquid crystal layer, disposed between the active device array substrate and the opposite substrate, and comprising a plurality of liquid crystal molecules,
    wherein
    the liquid crystal molecules disposed above the reflective region are pre-tilted, relative to a vertical direction normal to the substrates, at a first pretilt angle;
    the liquid crystal molecules disposed above the transmissive region are pre-tilted, relative to the vertical direction, at a second pretilt angle smaller than the first pretilt angle; and
    a single cell gap is formed between the active device array substrate and the opposite substrate.

2. The transflective LCD panel according to claim 1, further comprising a plurality of polymer molecules in the liquid crystal layer.

3. The transflective LCD panel according to claim 1, wherein the liquid crystal molecules are nematic liquid crystal molecules.

4. The transflective LCD panel according to claim 1, wherein each pixel unit further comprises
    a reflective pixel electrode disposed in the reflective region and electrically connected to the active device; and
    a transparent pixel electrode disposed in the transmissive region and electrically connected to the active device.

5. The transflective LCD panel according to claim 4, wherein the reflective pixel electrode comprises a bumped surface.

6. The transflective LCD panel according to claim 4, further comprising
    a dielectric layer disposed in the transmissive region and the reflective region and interposed in the vertical direction between the reflective pixel electrode and the transparent pixel electrode;
    wherein a distance between the reflective pixel electrode and a common electrode on the opposite substrate is greater than that between the transparent pixel electrode and the common electrode.

7. The transflective LCD panel according to claim 6, wherein the reflective pixel electrode and the transparent pixel electrode partially overlap each other.

8. The transflective LCD panel according to claim 4, wherein the reflective pixel electrode is electrically connected to the active device through the transparent pixel electrode.

9. A transflective liquid crystal display (LCD) panel, comprising:
- an active device array substrate comprising a plurality of scan lines, a plurality of data lines, and a plurality of pixel units, wherein each said pixel unit comprises a transmissive region, a reflective region and an active device electrically connected to a corresponding one of the scan lines and a corresponding one of the data lines;
- an opposite substrate; and
- a liquid crystal layer, disposed between the active device array substrate and the opposite substrate, and comprising a plurality of liquid crystal molecules, wherein liquid crystal molecules disposed above the reflective region are pre-tilted at a first pretilt angle, wherein each pixel unit further comprises;
- a metal layer, disposed in the reflective region and electrically connected to the active device;
- a dielectric layer, disposed in the reflective region and the transmissive region and covering the metal layer;
- a reflective pixel electrode, disposed on the dielectric layer in the reflective region and coupled with the metal layer to form a capacitor; and
- a transparent pixel electrode, disposed on the dielectric layer in the transmissive region and electrically connected to the active device.

10. The transflective LCD panel according to claim 9, wherein the reflective pixel electrode comprises a bumped surface.

11. The transflective LCD panel according to claim 10, wherein the metal layer is electrically connected to the active device through the transparent pixel electrode.

12. A transflective liquid crystal display (LCD) panel, comprising:
- an active device array substrate comprising a plurality of scan lines, a plurality of data lines, and a plurality of pixel units, wherein each said pixel unit comprises a transmissive region, a reflective region and an active device electrically connected to a corresponding one of the scan lines and a corresponding one of the data lines;
- an opposite substrate; and
- a liquid crystal layer, disposed between the active device away substrate and the opposite substrate, and comprising a plurality of liquid crystal molecules, wherein liquid crystal molecules disposed above the reflective region are pre-tilted at a first pretilt angle, wherein each pixel unit further comprises:
- a bumped metal layer, disposed in the reflective region;
- a first dielectric layer, conformally disposed on the bumped metal layer;
- a reflective pixel electrode, conformally disposed on the first dielectric layer and electrically connected to the active device;
- a second dielectric layer, disposed in the reflective region and the transmissive region and covering the reflective pixel electrode; and
- a transparent pixel electrode, disposed on the second dielectric layer in the transmissive region and electrically connected to the active device.

13. The transflective LCD panel according to claim 12, wherein the reflective pixel electrode and the transparent pixel electrode partially overlap each other.

14. The transflective LCD panel according to claim 12, wherein the reflective pixel electrode is electrically connected to the active device through the transparent pixel electrode.

15. A method of fabricating a transflective LCD panel, said method comprising:
- providing an active device array substrate comprising a plurality of pixel units, wherein each said pixel unit comprises a transmissive region, a reflective region, a reflective pixel electrode in the reflective region, and a transparent pixel electrode in the transmissive region;
- providing an opposite substrate;
- forming a liquid crystal layer between the active device away substrate and the opposite substrate, wherein the liquid crystal layer comprises a plurality of liquid crystal molecules and is doped with a plurality of monomer molecules;
- applying a first voltage to the reflective pixel electrode of each pixel unit, such that the liquid crystal molecules located in the reflective region are tilted at a first pretilt angle;
- converting the monomer molecules in the reflective region into polymer molecules;
- applying a second voltage to the transparent pixel electrode of each pixel unit, such that the liquid crystal molecules located in the transmissive region are tilted at a second pretilt angle smaller than the first pretilt angle; and
- converting the monomer molecules in the transmissive region into polymer molecules;
- wherein the monomer molecules in the transmissive region are convened into polymer molecules by being exposed to UV light radiated from the side of said active device away substrate, with the reflective pixel electrode acting as a mask to shield the monomer molecules in the reflective region from said UV light.

16. The transflective LCD panel according to claim 1, further comprising
- two alignment films on the substrates for causing the liquid crystal molecules above the transmissive region to orient in the vertical direction in the absence of a driving voltage applied to the LCD panel.

* * * * *